(12) United States Patent
Cho et al.

(10) Patent No.: US 11,390,200 B2
(45) Date of Patent: Jul. 19, 2022

(54) SKIRT DEVICE FOR VEHICULAR SEAT (71) Applicant: HYUNDAI TRANSYS INC., Seosan-si (KR)

(72) Inventors: Young Deok Cho, Suwon-si (KR); Jong Kyu Chae, Hwaseong-si (KR); Hyun Ki Park, Seoul (KR); Jae Ho Song, Seoul (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 0 days.

(21) Appl. No.: 17/270,583

(22) PCT Filed: Aug. 13, 2019

(86) PCT No.: PCT/KR2019/010315
§ 371 (c)(1),
(2) Date: Feb. 23, 2021

(87) PCT Pub. No.: WO2020/050513
PCT Pub. Date: Dec. 3, 2020

(65) Prior Publication Data
US 2021/0221265 A1 Jul. 22, 2021

(30) Foreign Application Priority Data
Sep. 4, 2018 (KR) .......................... 10-2018-0105177

(51) Int. Cl.
B60N 2/58 (2006.01)
B60N 2/60 (2006.01)

(52) U.S. Cl.
CPC ......... B60N 2/5816 (2013.01); B60N 2/5891 (2013.01); B60N 2/6018 (2013.01)

(58) Field of Classification Search
CPC ... B60N 2/5816; B60N 2/5891; B60N 2/6018
USPC ...................................... 297/452.56
See application file for complete search history.

(56) References Cited

FOREIGN PATENT DOCUMENTS

KR          101679991       * 11/2016

* cited by examiner

*Primary Examiner* — Mark R Wendell (57) ABSTRACT

The present invention relates to a skirt device for a vehicle seat. The main purpose of the present invention is to provide a skirt device, which is installed to surround the lower part of a seat from the rear surface thereof and thus covers a component or a unit at the lower part of the seat, thereby improving the exterior appearance of the seat. To achieve the purpose described above, the present invention provides a skirt device for a vehicle seat, which is disposed to extend downward from a seatback so as to cover the underside of a seat including the rear side of a seat cushion, the skirt device comprising: a skirt coupled to the lower end of the back board of the seatback and installed to surround the rear side of the seat cushion; and a skirt cover fixed to the underside of the seat such that the skirt cover is positioned at the lower side of the skirt so as to always cover the lower part of the skirt.

8 Claims, 7 Drawing Sheets

FIG. 1 a) ASYMMETRIC LOWER PORTION b) EXPOSURE OF INTERIOR UPON FORWARD FOLDING c) CRUMPLING OF SKIRT UPON REARWARD FOLDING d) EXPOSURE OF LOWER INNER COVER PORTION AND LEAKAGE OF ILLUMINATION OF FOOT LAMP TO REAR PASSENGER

SKIRT DEVICE FOR VEHICULAR SEAT

CROSS-REFERENCE TO RELATED APPLICATION

This application is a National Stage of International Application No. PCT/KR2019/010315, filed Aug. 13, 2019, which claims the benefit of Korean Patent Application No. 10-2018-0105177, filed on Sep. 4, 2018, the entireties of which are hereby incorporated herein by reference.

BACKGROUND

(a) Technical Field

The present disclosure relates to a skirt device for a vehicular seat, and more particularly to a skirt device for a vehicular seat which is mounted on the seat so as to surround the rear surface of the lower portion of the seat, thereby shielding components or devices at the lower portion of the seat and improving the appearance of the seat.

(b) Background Art

In general, a vehicular seat includes a seat cushion for supporting a lower body of a passenger, and a seatback for supporting an upper body of the passenger, and a headrest, which is mounted on the upper end of the seatback so as to support the passenger's head and neck.

Among these, the seatback includes a seat back frame, which is connected at the lower end thereof to the seat cushion so as to constitute the framework of the seatback and to maintain the shape of the seatback, and a seatback cushion surrounding the front surface of the seatback frame.

Furthermore, the seatback may further include a plate-shaped member, that is, a back board, which covers the rear surface of the seatback frame. The back board-type seat having the back board mounted thereon is mainly applied to a driver seat and a front passenger seat of a large-size sedan.

In keeping with the recent trend toward increased luxuriousness of vehicles, a seat is provided with various functions and devices. For example, a power headrest capable of controlling the position in vertical and anteroposterior directions of a headrest in a motorized manner, an electrically-driven device for controlling the position and height of a seat, the angle of a seatback and the like, a bolster controller, a hot wire for a seat, a seat air conditioner, a multimedia device and the like are known in the art.

Because components and devices such as wiring are intricately mounted in the seat, there is need to provide technology for preventing the components and the devices from being visually exposed to thus improve the appearance of the seat.

Accordingly, in the case of a luxury sedan, the rear portion of a seatback is surrounded by a back board, and the lower portion of the seatback is surrounded by a skirt, with the result that the rear portions of the seatback and the seat cushion are surrounded by the back board and the skirt and that components and devices at the lower portion of the seat are shielded by the skirt so as to prevent exposure to the outside.

The skirt is mounted to the lower end of the seatback of a front seat, such as a driver seat or a front passenger seat, so as to prevent the lower portion of the seat from being exposed during folding of the seatback. Because the skirt must be positioned under the seatback (the back board) and must absorb the motion of the seatback and define the appearance of the seatback, the skirt is generally made of a flexible material, such as a fabric mat capable of accommodating the motion of the seatback.

Figure 1:
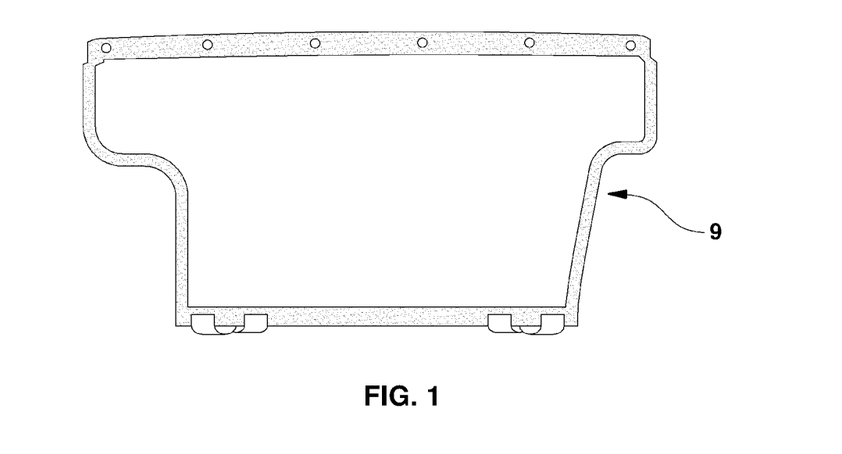
FIG. 1 is a front view illustrating a conventional skirt.

FIG. 1 is a view illustrating a conventional skirt. The conventional skirt 9 may be manufactured, for example, by sewing nylon BCF (Bulked Continuous Filament) as an outer material and nonwoven fabric as an inner material (treatment of finishing the peripheral portions).

However, because the conventional skirt, which is manufactured of a flexible material such as fabric and is used as a shielding barrier, undergoes wrinkling, drooping, crumpling or the like depending on the material properties and shape thereof or the motion of the seatback, there is a problem in ensuring a satisfactory appearance.

Figure 2:
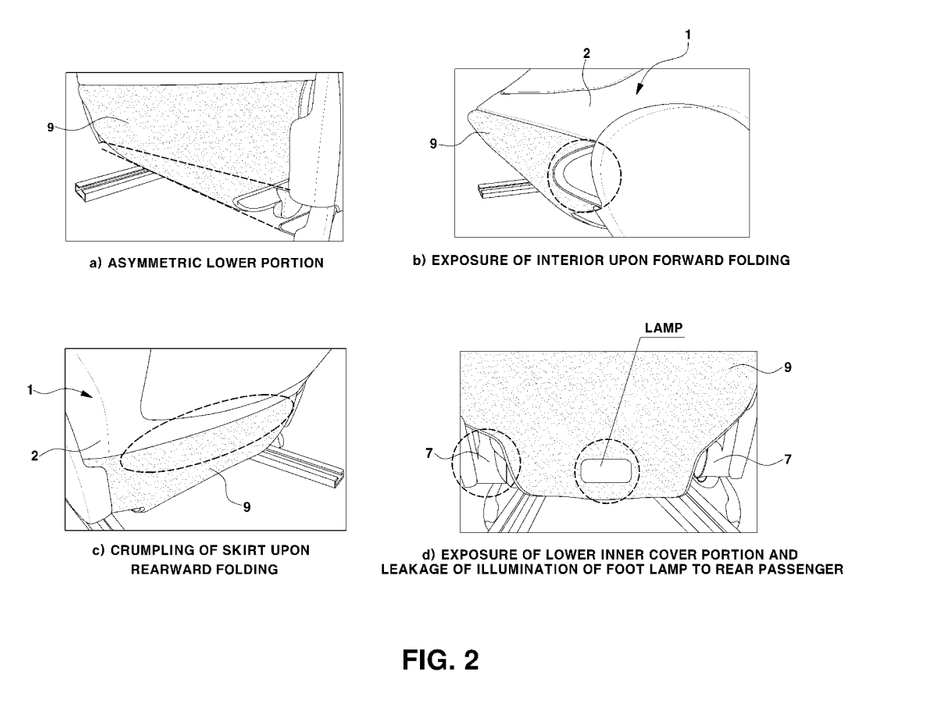
FIG. 2 is a view illustrating problems caused by a conventional skirt.

FIG. 2 is a view illustrating problems caused by a conventional skirt. As will be appreciated from the drawing, the conventional skirt may have problems in which a) the right side and the left side of the lower portion of the skirt 9 are asymmetric and b) the interior of the skirt 9 is greatly exposed through a gap in the lateral side end thereof when the seatback 1 is folded forwards.

Furthermore, the conventional skirt may have problems in which c) the skirt 9 is easily crumpled because the skirt 9 is made of fabric and d) the inside cover 7 of the front seat is exposed and visible to the outside or the light from a foot lamp at the front seat is visible to passenger in a rear seat.

Although various kinds of skirts have been suggested in order to solve these problems, there are still needs to solve various problems, such as jamming of a passenger's foot, difficulty in ensuring space for accommodating feet, contamination and various restrictions related to material properties.

Therefore, the present disclosure has been made in view of the above problems, and it is an object of the present disclosure to provide a skirt device for a vehicular seat capable of smoothly absorb the motion of a seatback and of smartly and luxuriously finishing the lower portion of the seat, thereby improving the merchantability of the seat.

It is another object of the present disclosure to provide a skirt device for a vehicular seat capable of solving or alleviating various problems with a conventional skirt, that is, an asymmetric structure of the lower portion of the skirt, exposure or crumpling of the interior of a seatback upon forward folding of the seatback, exposure of components at the lower portion of the seat, such as an inside cover, jamming of a rear passenger's foot, leakage of illumination, and contamination.

SUMMARY OF THE INVENTION

In accordance with the embodiments of the present disclosure, the above and other objects can be accomplished by the provision of a skirt device for a vehicular seat, which extends downwards from a seatback to surround both a rear portion of a seat cushion and a lower portion of the seat, the skirt device including a skirt coupled to a lower end of a back board of the seat back so as to surround the rear portion of the seat cushion, and a skirt cover, which is positioned under the skirt and is fixed to the lower portion of the seat so as to always surround a lower portion of the skirt.

In one aspect the skirt includes an inner plate made of synthetic resin through injection molding, and of an exterior material, which is coupled to the inner plate in a state of overlapping the inner plate and is exposed to a passenger in a rear seat.

In an embodiment, the exterior material may be silicone leather, which is silicone-based synthetic leather.

In still another embodiment, the inner plate and the exterior material being bonded to each other in an overlapping region thereof.

Embodiments of the present disclosure also include an upper end of the skirt including a coupling portion having a predetermined width, to which no inner plate is applied and which is prepared by folding an upper end of the exterior material and bonding the folded upper end to the exterior material, and the coupling portion may be fastened to an inner surface of the lower end of the back board, whereby the skirt is coupled to the lower end of the back board.

In another aspect, the inner plate may be prepared by bonding nonwoven fabric to a plate which is prepared from synthetic resin through injection molding.

In still further embodiment, the skirt cover may be fastened and fixed to inner portions of rear ends of right and left shield covers, which are positioned at the lower portion of the seat.

In yet further embodiment, the skirt cover may be provided on an inner surface thereof with a screw mount and a hook for coupling to the lower portion of the seat, the screw mount being fastened to the lower portion of the seat by means of a screw, and the hook being engaged in a hook-fitting hole.

In still another embodiment, the skirt cover may be provided on an inner surface thereof with guides, which guide two lateral side ends of the skirt therethrough.

In yet another embodiment, the skirt cover may be prepared by coating a surface of an inner plate, which is injection-molded from synthetic resin, through a surface treatment process, and the skirt cover may be composed of the inner plate and an outer layer, which is the coating layer formed on the surface of the inner plate through the surface treatment process.

In still yet another embodiment, the surface treatment process may be a suede fusion process of applying elastic adhesive composition to the surface of the inner plate and then applying pile to the composition.

Accordingly, since the skirt device for a vehicular seat according to the present disclosure is composed of the skirt and the skirt cover assembled with the skirt, there are effects of prevention of contamination, improvement of luxuriousness of appearance, protection of the lower portion of the seat and blocking of exposure of the lower portion of the seat, and it is possible to solve problems of jamming of a rear passenger's foot and leakage of illumination.

In still yet another embodiment, the skirt device for a vehicular seat according to the present disclosure, composed of the skirt and the skirt cover assembled with the skirt, conveys various effects of maintenance of the homogeneous appearance, improvement in operation of the skirt with motion of the seatback, cost reduction, improvement in sense of unity of color and appearance and improvement of merchantability of the seat.

DETAILED DESCRIPTION

Hereinafter, preferred embodiments of the present disclosure will be described in detail with reference to the attached drawings so as to enable the embodiments to be easily worked by those of ordinary skill in the art to which this disclosure belongs. However, the present disclosure is not limited to the embodiments disclosed hereinafter, but may be embodied in different modes.

When a part is mentioned as "comprising" an element throughout the specification, unless otherwise defined, the term "comprise" is used to designate that another element is not excluded but can further be included.

Figure 3:
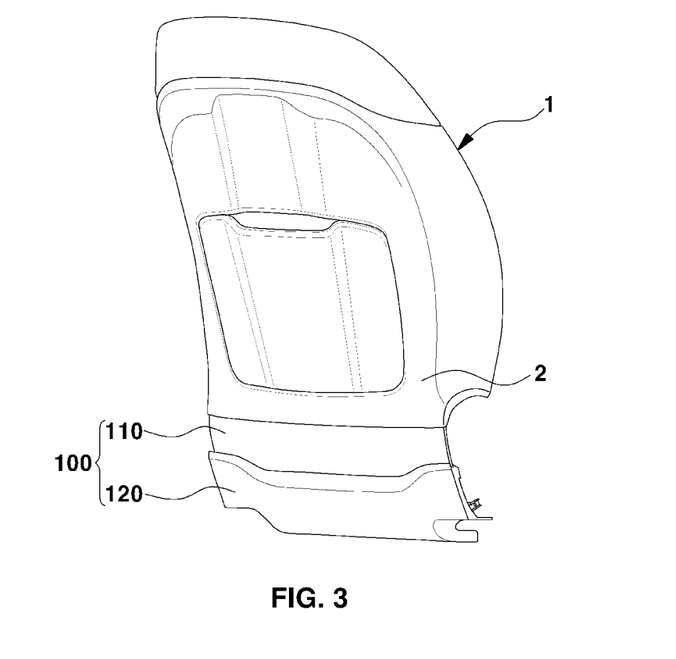
FIG. 3 is a perspective view illustrating a seat with which the skirt device according to an exemplary embodiment of the present disclosure is assembled.

FIG. 3 is a perspective view illustrating a seat with which the skirt device according to an embodiment of the present disclosure is assembled.

Figure 4:
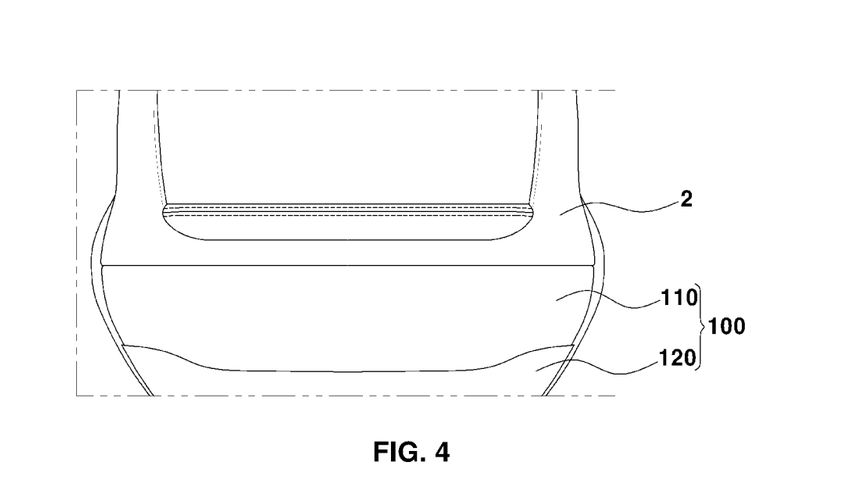
FIG. 4 is a view illustrating the skirt device according to the exemplary embodiment mounted on a lower portion of a seat.

FIG. 4 is a view illustrating the skirt device according to the embodiment of the present disclosure mounted on a lower portion of a seat.

Figure 5:
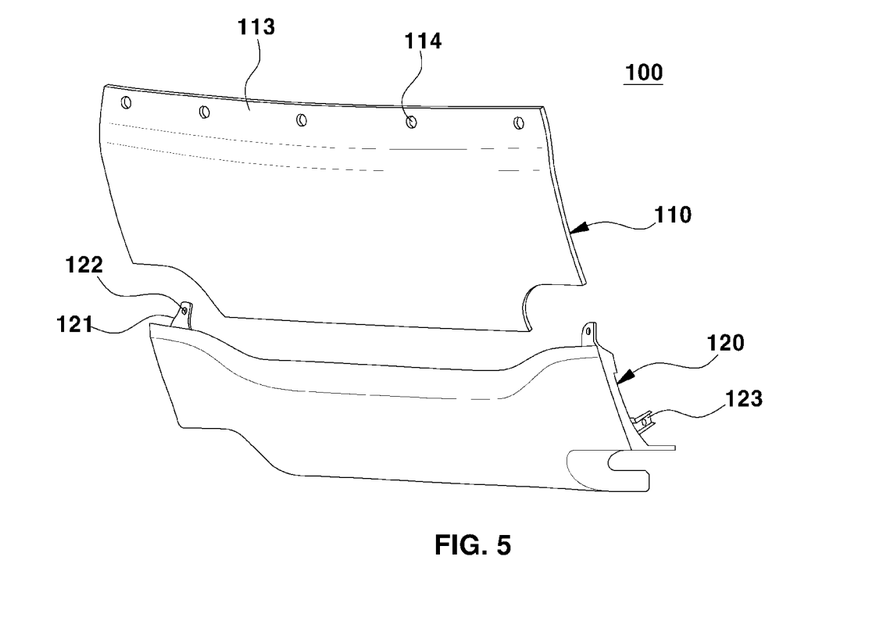
FIG. 5 is an exploded perspective view illustrating the construction of the skirt device according to an exemplary embodiment.
Figure 6:
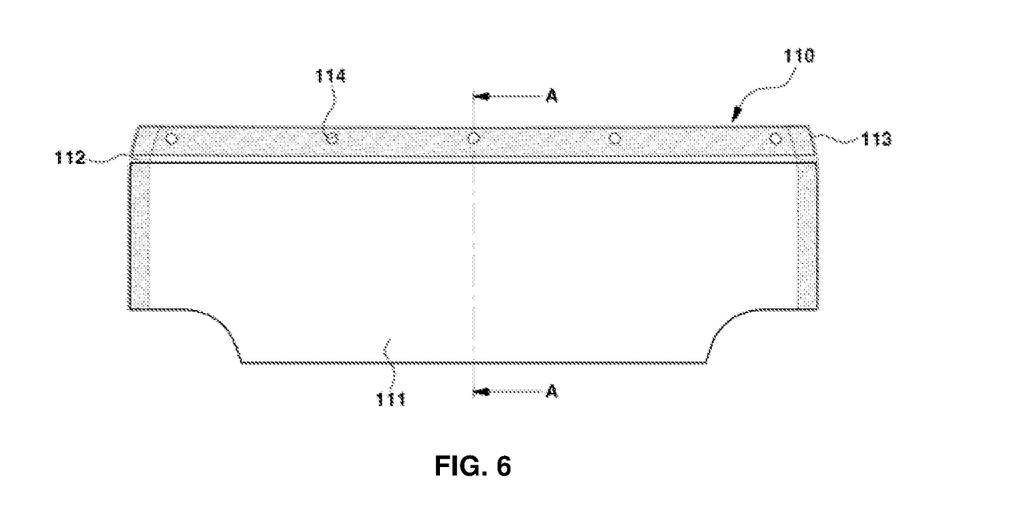
FIG. 6 is a front view illustrating the skirt of the skirt device according to the exemplary embodiment.

FIG. 5 is an exploded perspective view illustrating the construction of the skirt device according to an embodiment of the present disclosure. FIG. 6 is a front view illustrating the skirt of the skirt device according to the embodiment of the present disclosure.

Figure 7:
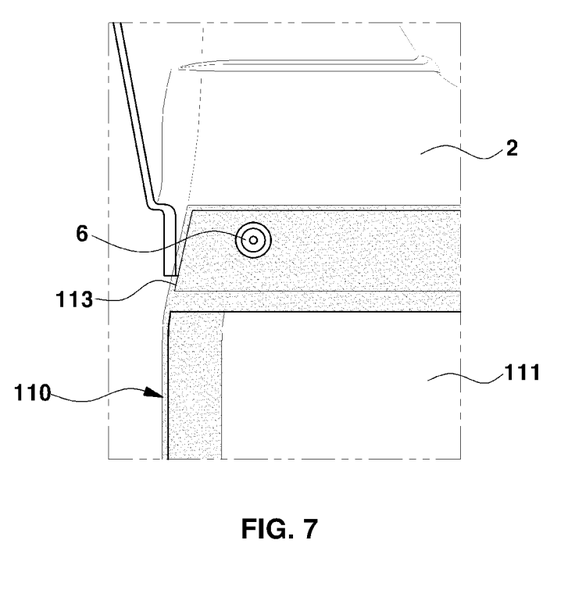
FIGS. 7 and 8 are views illustrating the state in which the skirt of the skirt device according to an exemplary embodiment of the present disclosure is coupled to a back board.
Figure 8:
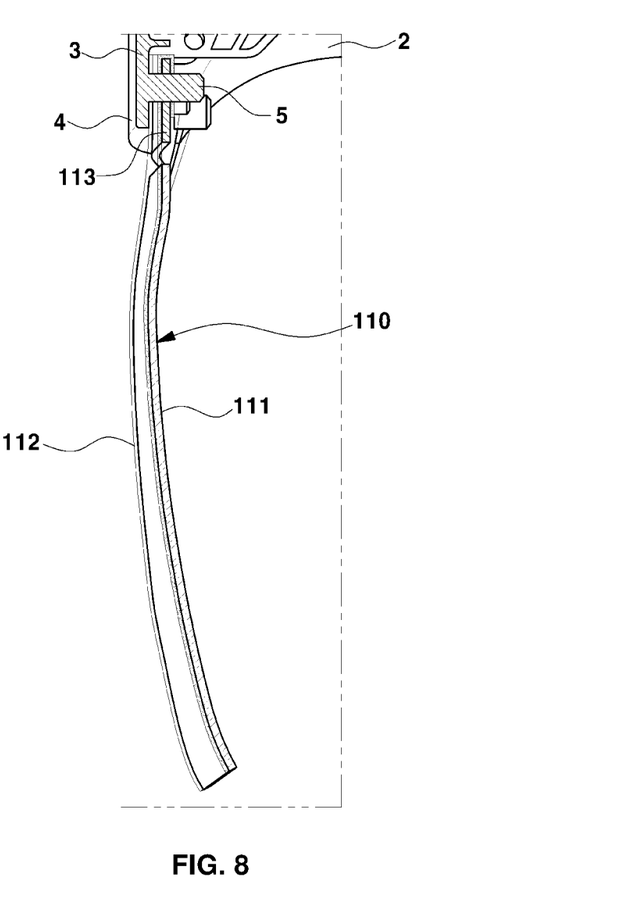

FIGS. 7 and 8 are views illustrating the state in which the skirt of the skirt device according to an embodiment of the present disclosure is coupled to a back board, in which FIG. 8 is a cross-sectional view taken along line A-A in FIG. 6.

As described in the drawings, the skirt device 100 according to an embodiment of the present disclosure extends downwards from a back board 2 of a seatback 1 so as to surround the lower portion of a seat including a seat cushion (not shown).

The skirt device 100 according to the embodiment of the present disclosure includes a skirt 110, which is coupled to the lower end of the back board 2 of the seat back 1 so as to surround the rear portion of the seat cushion and, in conjunction with the seat cushion, to accommodate the anteroposterior rotation of the seat back and the back board, and a skirt cover 120, which is positioned under the skirt 110 and is fixed to the lower portion of the seat so as to always surround the lower portion of the skirt.

According to the embodiment of the present disclosure, the skirt 110 is composed of an inner plate 111 made of a material having rigidity of a certain level or higher, and an exterior material 112 coupled to the outer surface (the back surface) of the inner plate 111 so as to overlap the inner plate 111 (see FIG. 8).

According to the embodiment of the present disclosure, the skirt 110 is constructed such that the inner plate 111 and the exterior material 112 are coupled to each other in the state of overlapping each other. The exterior material 112 is an external member of the skirt, which is exposed to the outside from the skirt 100 and is exposed to a passenger in the rear seat when the skirt 110 is mounted under a front seat.

In contrast, the inner plate 111 is a member, which is positioned on the inner side (the inner side of the skirt that faces toward the space under the seat) and in front of the exterior material 112 when viewed by a passenger in the rear seat.

As described above, the skirt 110 according to the embodiment of the present disclosure may be manufactured by bonding one inner plate 111 and one exterior material 112 to each other.

According to the embodiment of the present disclosure, the inner plate 111 of the skirt 110 may be manufactured by attaching nonwoven fabric to a plate which is prepared by injection molding of polypropylene (PP), and may serve to reliably maintain the shape of the skirt 110.

Although the drawings do not illustrate the skirt 110 to such an extent that the plate and the nonwoven fabric are individually depicted, the exterior material 112 may be attached to one surface of the inner plate 111, which is prepared through injection molding. Here, the nonwoven fabric may be attached to the surface of the inner plate 111 opposite the surface to which the exterior material 112 is attached.

The exterior material 112 of the skirt 110 may be coupled to the inner plate 111 in the state of overlapping the inner plate 111, and may serve to improve the ability of the skirt 110 to block contamination. As the exterior material 112, a sheet made of synthetic leather made of a silicone-based material, that is, silicone leather, is preferably used.

The exterior material 112 may be coupled to the surface of the inner plate 111 by bonding the exterior material 112 to the inner plate 111 using an adhesive, thermal adhesion or the like.

According to the embodiment of the present disclosure, the upper peripheral portion of the skirt 110, that is, the upper end of the skirt, having a predetermined width, is not provided with the inner plate 111.

The upper end of the skirt 110, which is not provided with the inner plate 111, includes a coupling portion having a predetermined width, which is formed by folding the upper end of the exterior material 112 and then bonding the folded portion to the exterior material.

In other words, the coupling portion of the skirt 110 is formed by folding the portion of the exterior material 112, which is not provided with the inner plate 111, and then bonding the folded portion to the exterior material 112.

Specifically, the upper portion of the exterior material 112 is cut so as to have a larger size than the inner plate 111, and the upper portion of the exterior material 112 is folded without the inner plate 111. Subsequently, only the folded upper end is bonded to the exterior material 112.

In this case, an additional pad 113 may be attached to the upper end of the exterior material 112 of the skirt 110.

Furthermore, according to the embodiment of the present disclosure, the two lateral side ends of the skirt 110 may be constructed such that the two lateral side ends of the exterior material 112 are folded so as to surround the lateral sides of the inner plate 111 and the folded end portions of the exterior material 112 are bonded to the two lateral side ends of the inner plate 111.

Subsequently, the lower end of the exterior material 112, other than the upper end and the lateral side ends thereof, is finally cut so as to coincide with the lower end of the inner plate 111.

When the skirt is manufactured in this way, a sewing operation of finishing the peripheral portion of the skirt 110 may be omitted, and there is no need to provide a band required to finish the peripheral portion of the skirt 110.

Accordingly, there are advantages of simplifying processing and reducing manufacturing costs. Particularly, since the plate, which is prepared through molding of resin, is applied to the inner plate 111, it is possible to improve the ability to maintain the shape of the skirt, and it is possible to completely solve the problem in which the illumination of a foot lamp at a front seat is exposed to a passenger in a rear seat.

Referring to FIGS. 7 and 8, reference numeral "2" denotes the back board, reference numeral "3" denotes the inner plate 111 of the back board, and reference numeral "4" denotes the exterior material (the skin material) 112 of the back board.

As described above, the upper end of the skirt, which is not provided with the inner plate 111, includes the coupling portion, which is prepared by folding silicone leather and then attaching the folded portion to the silicone leather and which is coupled to the lower end of the back board 2. Since the coupling portion overlaps the inner surface of the lower end of the back board 2, the coupling portion is not exposed to the outside by the back board.

The upper end of the skirt 110, which is the portion coupled to the back board 2, may have formed therein a plurality of pin holes 114, into which fastening pins 5 are inserted.

When the skirt 110 is assembled, the upper end of the skirt is coupled to the inner surface of the lower end of the back board 2, which is not exposed to the outside. For the coupling, the plurality of fastening pins 5 projects from the inner surface of the lower end of the back board.

Therefore, the fastening pins 5 formed on the inner surface of the lower end of the back board 2 are inserted into the corresponding pin holes 114 in the upper end of the skirt 110, and push nuts 6 (see FIG. 7) are engaged with the fastening pins 5 so as to prevent the upper end of the skirt from being separated from the back board, thereby fixing the skirt 110 to the back board 2.

As described above, the exterior material 112 of the upper end of the skirt 110, which is the portion coupled to the back board 2, is folded, and the upper end of the skirt 110, which is composed of only the exterior material 112, is coupled to the lower end of the back board 2 by virtue of the engagement of the fastening pins 5 with the push nuts 6. As a result, there is an advantage of being capable of more freely design the shape of the skirt 110 during anteroposterior reclining motion of the seat.

Subsequently, the skirt 110 is fixed to the back board 2 mounted on the seat back 1, and the skirt cover 120, which is separately prepared, is coupled to the skirt so as to surround the lower portion of the skirt 110.

In the skirt device 100 according to the embodiment of the present disclosure, the skirt cover 120 is fixedly coupled to inner portion of the rear ends of shield covers 8, which are positioned on the right and left sides of the lower portion of the seat.

The skirt cover 120 maintains the position thereof for serving as a skirt even when the seat back is folded. The skirt cover 120 is constructed so as to cover the lower portion of the skirt 110 without a gap therebetween in the full operating range of the seatback 1, including the position at which the seatback 1 is maximally folded forwards.

Particularly, considering that the skirt 110 is moved with movement of the seatback 1, whereas the skirt cover 120 is maintained in the state of being coupled to the right and left shield covers 8, the shapes of the skirt 110 and the skirt cover 120 are designed such that the skirt cover 120 always surrounds and covers the lower portion of the skirt 110, which is moved with movement of the seat back, regardless of the position of the seatback 1.

Figure 9:
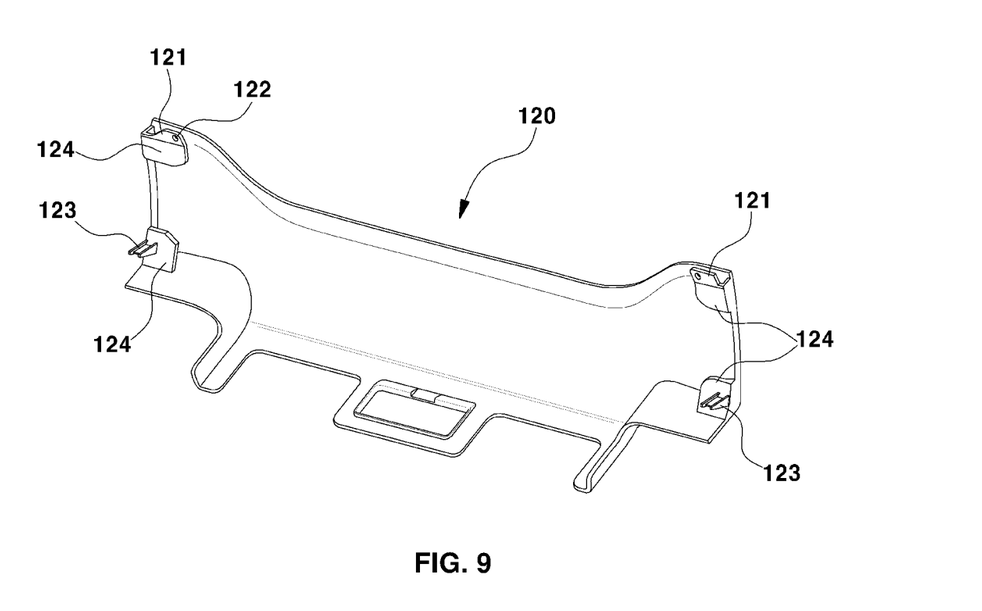
FIG. 9 is a perspective view illustrating the skirt cover of the skirt device according to the exemplary embodiment.
Figure 10:
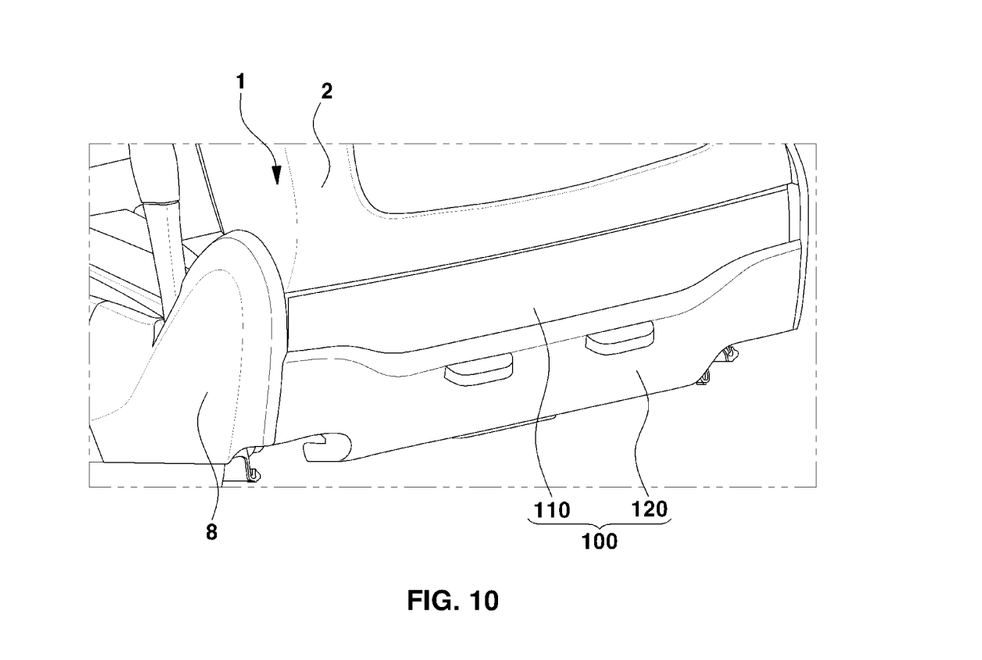
FIG. 10 is a perspective view illustrating the state in which the skirt cover according to the exemplary embodiment is assembled with the shield cover.

FIG. 9 is a perspective view illustrating the skirt cover of the skirt device according to the embodiment of the present disclosure. FIG. 10 is a perspective view illustrating the state in which the skirt cover according to the embodiment of the present disclosure is assembled with the shield cover. The skirt cover 120 is a component that is newly introduced by the present disclosure, and is capable of being mounted on the shield covers 8 by means of fastening elements such as screws (not shown) or hooks 123.

To this end, screw holes 122 or hooks 123 may be formed at the inner surface of the skirt cover 120. Alternatively, both the screw holes 122 and the hooks 123 may be formed at the inner surface of the skirt cover 120, as illustrated in the drawing.

FIG. 9 illustrates the skirt cover 120, which is coupled to the shield covers 8 using both the screw holes 122 and the hooks 123. As illustrated in the drawing, screw mounts 121 are respectively formed on upper right and left sides of the inner surface of the skirt cover 120, and the screw holes 122 are respectively formed through the screw mounts 121.

Furthermore, the hooks 123 are formed on lower right and left sides of the inner surface of the skirt cover 120 so as to project therefrom.

In an assembly operation, the skirt cover 120 is first positioned in the predetermined normal location so as to surround the lower portion of the skirt 110, and the hooks 123 of the skirt cover 120 are then fitted into hook holes (not shown), which are formed in the shield covers 8 at corresponding positions.

Subsequently, the screw holes 122 formed in the screw mounts 121 of the skirt cover 120 are aligned with the screw holes (not shown) formed in corresponding portions of the shield covers 8, and the screws are engaged in the screw holes.

According to a preferred embodiment, the inner surface of the skirt cover 120 is provided with guides 124 projecting therefrom so as to guide sliding movement of the skirt 110 while the skirt 110 is moved together with the seat back upon folding of the seatback 1.

The guides 124 may be formed on the right and left sides of the inner surface of the skirt cover 120, and may be spaced apart from the inner surface of the skirt cover 120 by a predetermined distance such that the right and left side ends of the skirt 110 are inserted between the guides and the inner surface of the skirt cover 120 and are guided therebetween.

According to the embodiment of the present disclosure, each of the guides 124 may be configured so as to define a U-shaped cross-section in conjunction with the inner surface of the skirt cover 120. Accordingly, the lateral side ends of the skirt 110 are inserted into the U-shaped cross-section and are guided thereby.

Referring to FIG. 9, it is to be noted that the screw mounts 121 extend upwards from the respective guides 124, which are positioned at the upper right and left sides of the skirt cover 120 and the hooks 123 for coupling to the shield covers 8 project forwards from two guides, which are positioned at the lower right and left sides of the skirt cover 120.

According to the embodiment of the present disclosure, because the skirt cover 120 is a structure that is coupled to the skirt 110 so as to surround the lower portion of the skirt 110, the overall structure of the skirt cover 120 may have the plate shape illustrated in FIG. 9.

According to the embodiment of the present disclosure, although the inner portion of the skirt cover 120 may be made of synthetic resin, it is preferable that a separate outer layer be formed on a surface of an inner plate, which is made of synthetic resin, through treatment such as coating, in order to improve the appearance and the luxuriousness and to prevent contamination.

Although the inner plate and the outer layer formed on the surface of the inner plate are not individually illustrated in FIG. 9, the inner plate may have the same shape as the skirt cover 120 shown in FIG. 9, and the outer layer may be formed on the surface of the inner plate having the same shape as the skirt cover 120.

For the purpose of manufacturing the skirt cover 120 according to the embodiment of the present disclosure, the inner plate having a desired overall shape that is the same as the skirt cover is first prepared from synthetic resin such as polypropylene (PP) through injection molding, and the surface of the inner plate is then subjected to a suede fusion process, thereby forming the outer layer on the surface of the inner plate.

The inner plate, which serves to maintain the framework of the skirt cover and to increase the rigidity of the skirt cover, is molded from synthetic resin having rigidity of a target level or higher so as to maintain the shape of the skirt cover.

The suede fusion process is a known surface treatment process for molded plastic interior products for vehicles. For example, a suede fusion process in which an elastic adhesive composition, for example a high-elasticity aqueous adhesive composition, is applied to the surface of an inner plate and pile is applied to the composition may be applied to the embodiment of the present invention.

The suede fusion process is merely for illustrative purposes, and the present invention is not limited thereto. Surface treatment for molded plastic products or a suede fusion process, which is known in the art, may be applied, as long as the process is able to achieve the objective of improving the appearance, the luxuriousness and the ability to prevent contamination of the surface of the inner plate constituting the skirt cover. Since various processes for surface treatment are known in the art, a detailed description of the processes will be omitted.

As described above, since the skirt device according to the embodiment of the present invention is additionally provided with the separate skirt cover 120 for surrounding the lower portion of the skirt 110, it is possible to improve the appearance and to reliably prevent exposure of the lower portion of the seat by virtue of the structure of shielding the lower end of the seat back.

Furthermore, it is possible to protect not only the lower portion of the seat but also components and devices that are positioned or mounted under the lower portion of the seat, and it is possible to reliably prevent jamming of the foot of a passenger in a rear seat and leakage of illumination of a foot lamp.

Accordingly, when the skirt device according to the embodiment of the present invention is applied to a vehicle, there are advantages of improving the appearance, the luxuriousness, the homogeneity of appearance and the operating performance of the skirt.

Furthermore, since the skirt is manufactured in such a way as to apply an antipollution material such as silicone leather to the molded plate to surround the molded plate, it is possible to prevent or minimize contamination of the skirt by a passenger in a rear seat and to improve the luxuriousness of the appearance.

In addition, unlike a conventional skirt, which requires a process of finishing the peripheral portions of nylon BCF (Bulked Continuous Filament) and nonwoven fabric, there is an advantage of simplifying processing and of reducing manufacturing costs.

Furthermore, although a conventional skirt must be inevitably manufactured to have black or grey color, which is completely different from the color of a seat cover, since the skirt device according to the embodiment of the present invention uses silicone leather as the finishing material (the exterior material), which can be prepared from material having a desired color, among various colors, it is possible to manufacture a skirt having a beautiful appearance.

In addition, it is possible to manufacture a skirt having the same color as a seat cover. Accordingly, there are effects of improving a sense of unity in appearance, luxuriousness, and merchantability.

Figure 11:
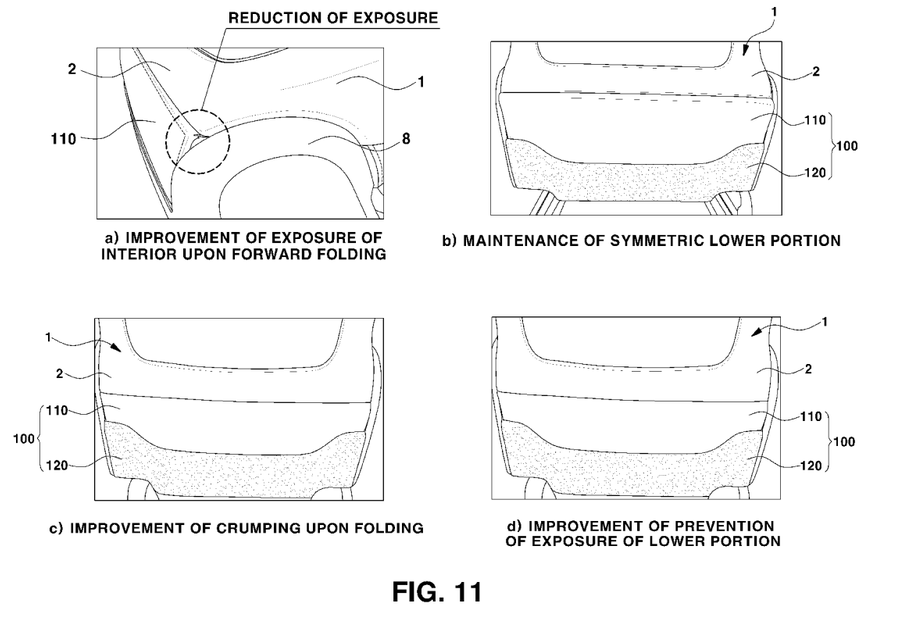
FIG. 11 is a view illustrating advantages of the skirt device according to the exemplary embodiment.

As will be appreciated from FIG. 11, a) the present invention is able to solve a problem of exposure of the skirt 110 since exposure of the inside of the skirt 110 through the gap between the skirt 110 and the shield covers 8 is minimized during forward folding of the seatback 1.

Although the conventional skirt has an asymmetrical structure at the right and left sides of the lower portion of the skirt (see FIG. 1), b) the present invention is able to maintain the symmetrical structure in the lower portion of the skirt 110 regardless of the structure of the seatback 1.

Furthermore, a conventional skirt has a problem in which the skirt may be wrinkled depending on the state of the seatback (for example, upon rearward folding of the seatback), c) the present invention is able to prevent wrinkling of the skirt.

In addition, although a conventional skirt may have problems in which components at the lower portion of a seat, such as an inside cover, are exposed to the outside and illumination of a foot lamp at a front seat is exposed to a passenger in a rear seat, d) the present invention is able to reliably prevent the lower portion of the seat from being exposed and the illumination of a foot lamp from leaking.

Although the preferred embodiments of the present invention have been described in detail, the scope and spirit of the invention is not limited thereto, and various modifications and improvements, which are made by those skilled in the art using the basic idea defined by the accompanying claims, fall within the scope of the present invention.

What is claimed is:

1. A skirt device for a vehicular seat, which extends downwards from a seatback to surround both a rear portion of a seat cushion and a lower portion of the seat, the skirt device comprising:
   a skirt coupled to a lower end of a back board of the seatback so as to surround the rear portion of the seat cushion; and
   a skirt cover, which is positioned under the skirt and is fixed to the lower portion of the seat so as to always surround a lower portion of the skirt,
   wherein the skirt includes:
   an inner plate; and
   an exterior material, which is coupled to the inner plate in a state of overlapping the inner plate and is exposed to a passenger in a rear seat, and
   wherein the inner plate and the exterior material are bonded to each other in an overlapping region thereof.

2. The skirt device for a vehicular seat according to claim 1, wherein
   the inner plate is made of synthetic resin through injection molding.

3. The skirt device for a vehicular seat according to claim 2, wherein the inner plate is prepared by bonding nonwoven fabric to a plate which is prepared from synthetic resin through injection molding.

4. The skirt device for a vehicular seat according to claim 1, wherein an upper end of the skirt includes a coupling portion having a predetermined width, to which no inner plate is applied and which is prepared by folding an upper end of the exterior material and bonding the folded upper end to the exterior material, and
   wherein the coupling portion is fastened to an inner surface of the lower end of the back board, whereby the skirt is coupled to the lower end of the back board.

5. The skirt device for a vehicular seat according to claim 1, wherein the skirt cover is fastened and fixed to inner portions of rear ends of right and left shield covers, which are positioned at the lower portion of the seat.

6. The skirt device for a vehicular seat according to claim 1, wherein the skirt cover is provided on an inner surface thereof with a screw mount and a hook for coupling to the lower portion of the seat, the screw mount being fastened to the lower portion of the seat by means of a screw, and the hook being engaged in a hook-fitting hole.

7. The skirt device for a vehicular seat according to claim 1, wherein the skirt cover is provided on an inner surface thereof with guides, which guide two lateral side ends of the skirt therethrough.

8. The skirt device for a vehicular seat according to claim 1, wherein the skirt cover is prepared by coating a surface of an inner plate, which is injection-molded from synthetic resin, through a surface treatment process, and wherein the skirt cover is composed of the inner plate and an outer layer, which is the coating layer formed on the surface of the inner plate through the surface treatment process.

* * * * *